US008718280B2

(12) United States Patent
Farrugia et al.

(10) Patent No.: US 8,718,280 B2
(45) Date of Patent: May 6, 2014

(54) SECURING KEYS OF A CIPHER USING PROPERTIES OF THE CIPHER PROCESS (75) Inventors: Augustin J. Farrugia, Cupertino, CA (US); Benoit Chevallier-Mames, Paris (FR); Mathieu Ciet, Paris (FR); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 12/972,145

(22) Filed: Dec. 17, 2010

(65) Prior Publication Data

US 2012/0155638 A1  Jun. 21, 2012

(51) Int. Cl.
*H04L 9/28* (2006.01)
*H04L 9/14* (2006.01)

(52) U.S. Cl.
USPC ............. 380/45; 380/28; 380/37; 380/42

(58) Field of Classification Search
USPC .......... 380/28, 45, 252, 255, 37, 42; 713/189, 713/194; 708/490, 492
See application file for complete search history.

(56) References Cited

U.S. PATENT DOCUMENTS

| 4,316,055 A * | 2/1982 | Feistel | 380/37 |
| 4,751,733 A * | 6/1988 | Delayaye et al. | 380/42 |
| 2003/0133568 A1 * | 7/2003 | Stein et al. | 380/37 |
| 2003/0223580 A1 * | 12/2003 | Snell | 380/28 |
| 2011/0170691 A1 * | 7/2011 | Liardet et al. | 380/259 |

* cited by examiner

*Primary Examiner* — Brandon Hoffman
*Assistant Examiner* — Samuel Ambaye
(74) *Attorney, Agent, or Firm* — Adeli LLP (57) ABSTRACT In the field of computer enabled cryptography, such as a block cipher, the cipher is hardened against an attack by protecting the cipher key, by applying to it a predetermined linear permutation before using one key to encrypt or decrypt a message. This is especially advantageous in a "White Box" environment where an attacker has full access to the cipher algorithm, including the algorithm's internal state during its execution. This method and the associated computing apparatus are useful where the key is derived through a process and so is unknown when the software code embodying the cipher is compiled. This is typically the case where there are many users of the cipher and each has his own key, or where each user session has its own key.

36 Claims, 3 Drawing Sheets

SECURING KEYS OF A CIPHER USING PROPERTIES OF THE CIPHER PROCESS

FIELD OF THE INVENTION

This invention relates to data security and cryptography and more generally to improving the security of computer enabled cryptographic processes.

BACKGROUND

In the field of data security, there is a need for fast and secure encryption. This is why the AES (Advanced Encryption Standard) cipher has been designed and standardized. Cryptographic algorithms are widely used for encryption and decryption of messages, authentication, digital signatures and identification. AES is a well known symmetric key block cipher. Block ciphers operate on blocks of plaintext and ciphertext, usually of 64 or 128 bits length but sometimes longer. Stream ciphers are the other main type of cipher and operate on streams of plain text and cipher text 1 bit or byte (sometimes one word) at a time. There are modes (notably the ECB, electronic code block) where a given block is encrypted to always the same ciphertext block. This is an issue which is solved by a more evolved mode of operations, e.g. CBC (cipher block chaining) where a chaining value is used to solve the 1-to-1 map.

AES is approved as an encryption standard by the U.S. Government. Unlike its predecessor DES (Data Encryption Standard), it is a substitution permutation network (SPN). AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Each round involves the same processes. Use of multiple rounds enhances security. Block ciphers of this type use in each round a substitution box (s-box). This operation provides non-linearity in the cipher and significantly enhances security.

Note that these block ciphers are symmetric ciphers, meaning the same algorithm and key are used for encryption and decryption, except usually for minor differences in the key schedule. As is typical in most modern ciphers, security rests with the (secret) key rather than the algorithm. The s-boxes or substitution boxes accept an n-bit input and provide an m bit output. The values of m and n vary with the cipher and the s-box itself. The input bits specify an entry in the s-box in a particular manner well known in the field.

Many encryption algorithms are primarily concerned with producing encrypted data that is resistant to decrypting by an attacker who can interact with the encryption algorithm only as a "Black Box" (input-output) model, and cannot observe internal workings of the algorithm or memory contents, etc due to lack of system access. The Black Box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the Black Box model can be relaxed. An extreme relaxation is called the "White Box" model. In a White Box model, it is presumed that an attacker has total access to the system performing an encryption, including being able to observe directly a state of memory, program execution, modifying an execution, etc. In such a model, an encryption key can be observed in or extracted from memory, and so ways to conceal operations indicative of a secret key are important.

Classically software implementations of cryptographic building blocks are insecure in the White Box threat model where the attacker controls the execution process. The attacker can easily lift the secret key from memory by just observing the operations acting on the secret key. For example, the attacker can learn the secret key of an AES software implementation by observing the execution of the Key Schedule algorithm.

Hence there are two basic principles in the implementation of secure computer applications (software). The Black Box model implicitly supposes that the user does not have access to the computer code nor any cryptographic keys themselves. The computer code security is based on the tampering resistance over which the application is running, as this is typically the case with SmartCards. For the White Box model, it is assumed the (hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in content protection and distribution applications to protect e.g. audio and video content.

Software implementations of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

Content protection applications are one instance where it is desired to keep the attacker from finding the secret key even though the attacker has complete control of the execution process. The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups (also referred to as TLUs) to obscure the secret key within the table lookups, and obscure intermediate state information that would otherwise be available in arithmetic implementations of AES. In the computer field, a table lookup table is an operation using a data structure (the table) to replace a computation with an array indexing operation.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key. Chow et al. provide a construction of the AES algorithm for such White Box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

The conventional implementation of a block cipher in the White Box model is carried out by creating a set of table lookups. Given a dedicated cipher key, the goal is to store in a table the results for all the possible input messages. This principle is applied for each basic operation of the block cipher. In the case of the AES cipher, these are the shiftRow, the add RoundKey, the subByte and the mixColumns operations.

However, Chow et al. do not solve all the security needs for block cipher encryption in a White Box environment. Indeed, the case where the cipher key is derived through a given process and so is unknown at the code compilation time is not included in Chow et al.

SUMMARY

A typical situation not addressed by Chow et al. is when a computer enabled and software based cryptographic process is distributed over several users and each user has his own cipher key; it is, from a practical point of view, impossible to disseminate different software code to each user. Another situation is when generating session keys (which by definition are different for each user session) through a given process. Of course, in this case the key is unknown at the software code compilation time.

This disclosure is of a powerful, efficient and new solution to harden the extraction of an AES (or other cryptographic) key in a White Box environment. Further, the present method may be used in a more general case of other cryptographic processes, as long as the key injection is made using an exclusive OR. (XOR) Boolean logic operation. The present disclosure therefore is directed to hiding the key in a better way.

The present system and method address those cases when the cipher key is unknown at the software code compilation time or when the code size is limited, and there is a need to harden dynamically the cryptographic process and hide the key to protect against an attacker. The cryptographic process is, e.g., encryption or decryption of respectively a plaintext or ciphertext message. This aspect of the present disclosure can be combined with prior existing solutions. The most simple and known existing solution to combined with is to perform data transforms on the cipher key, done to avoid visible removable during execution of the cryptographic process. brief description of the figures

DETAILED DESCRIPTION

AES Description

Figure 1:
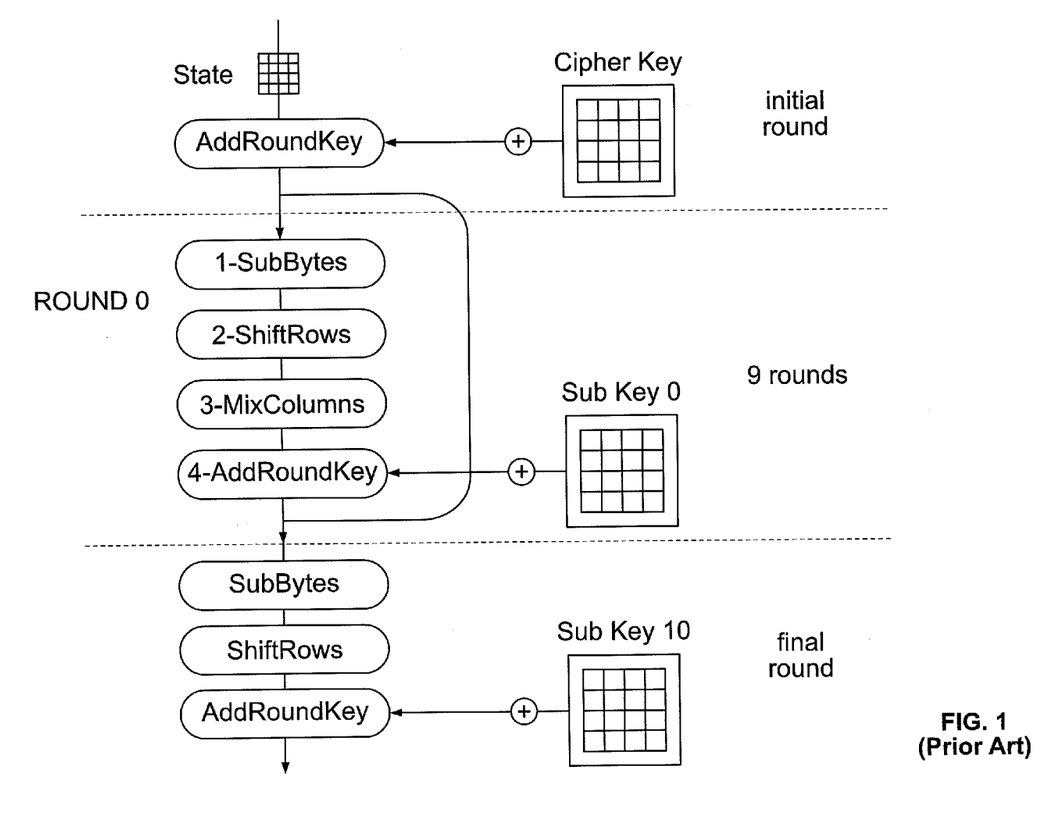
FIG. 1 shows in the prior art AES encryption.

See the NIST AES standard for a more detailed description of the AES cipher (Specification for the ADVANCED ENCRYPTION STANDARD (AES), NIST, which can be found in the Internet). The following is a summary of the well known AES cipher. The AES cipher uses a 16 byte cipher long key, and has 10 rounds (final plus 9 others). The entire AES algorithm has the following operations as depicted in FIG. 1 graphically and showing round zero of the 9 rounds:

11 AddRoundKey Operations
10 SubByte Operations
10 ShiftRow Operations
9 MixColumn Operations AES is computed using a 16-byte buffer (computer memory) referred to as the AES "state" in this disclosure and shown in FIG. 1.

To summarize,
(i) AddRoundKeys (ARK) are logically XOR'd the (Boolean exclusive OR operation) with some subkey bytes.
(ii) ShiftRows (SR) are a move from one byte location to another.
(iii) MixColums (MC) are a linear table-look up (TLU) applied to 4 bytes.
(iv) SubBytes (SB) are a non-linear TLU applied to 1 byte.

Preliminarily to the decryption itself, in the initial round in FIG. 1, the original 16-byte cipher key is expanded to 11 subkeys designated K0, . . . , K10, so there is a subkey for each round during what is called the key-schedule. Each subkey, like the original key, is 16-bytes long.

The following explains the AES encryption process round by round. For the corresponding decryption process, one generally performs the inverse of each operation, in the inverse order. (Note that this is mathematically the inverse but the implementation is not necessarily the inverse step by step.) The same is true for the cryptographic processes in accordance with the invention as set forth below. The inverse operation of ARK is ARK itself, the inverse operation of SB is the inverse subbyte (ISB) which is basically another TLU, the inverse operation of MC is the inverse mix column (IMC) which is basically another TLU, and the inverse operation of SR is the inverse shift row (ISR) which is another move from one byte location to another.

Expressed schematically, AES decryption is as follows:
ARK (K10)
ISR
ISB
ARK (K9)
IMC
ISR
ISB
ARK (K8)
IMC
ISR
ISB
ARK (K7)
IMC
ISR
ISB
ARK (K6)
IMC
ISR
ISB
ARK (K5)
IMC
ISR
ISB
ARK (K4)
IMC
ISR
ISB
ARK (K3)
IMC
ISR

ISB
ARK (K2)
IMC
ISR
ISB
ARK (K1)
IMC
ISR
ISB
ARK (K0)

Without lack of generality, the description below of the present method is for the case of decryption, but it is evident that the method in accordance with the invention can be used also for encryption or other cryptographic processes. The method in accordance with the invention also can easily be applied to other variants of AES with more rounds (the 192 and 256-bit key length versions) as well as to other block ciphers and more generally to non-block ciphers and other key based cryptographic processes.

AES is considered very efficient in terms of execution on many different computer architectures since it can be executed only with table lookups (TLU) and the exclusive-or (XOR) operation. It is known that the AES state can be handled as a 4×4 square of bytes. As a square, it can be seen as 4 columns of 4 bytes each.

As described above, AES decryption is a succession of basic operations: ISB for the inverse of SubByte, IMC (for the inverse of MixColumn) and ISR (for the inverse of ShiftRow). The ISR operation modifies the state by shifting each row of the square. This operation does not modify the bytes themselves but only their respective positions. The ISB operation is a permutation from [0, 255] to [0, 255], which can be implemented by a table look-up.

The IMC operation is a bijective linear function from a column (4B) to a column. As a linear function, it accepts a matrix as a representation expressed as:

$$[\phi e, \phi 9, \phi d, \phi b]$$
$$[\phi b, \phi e, \phi 9, \phi d]$$
$$[\phi d, \phi b, \phi e, \phi 9]$$
$$[\phi 9, \phi d, \phi b, \phi e]$$

where each coefficient in this matrix represents a linear function applied to a byte. For a vector [w, x, y, z] of four bytes, the output of operation IMC is expressed as:

$$\begin{bmatrix} [\phi e \cdot w \; XOR \; \phi 9 \cdot x \; XOR \; \phi d \cdot y \; XOR \; \phi b \cdot z], \\ [\phi b \cdot w \; XOR \; \phi e \cdot x \; XOR \; \phi 9 \cdot y \; XOR \; \phi d \cdot z], \\ [\phi d \cdot w \; XOR \; \phi b \cdot x \; XOR \; \phi e \cdot y \; XOR \; \phi 9 \cdot z], \\ [\phi 9 \cdot w \; XOR \; \phi d \cdot x \; XOR \; \phi b \cdot y \; XOR \; \phi e \cdot z] \end{bmatrix}$$

In order to be implemented efficiently, one needs to modify the order of the operations executed in AES decryption. Since IMC is a linear operation and since the ARK operation consists of logically XORing a constant to the AES state, these operations can be permuted. This idea is known and is used often in optimized AES decryption implementations.

However, this implies a modification of the keys used in the ARK operation. Let Ki be the 16-Byte subkey used in the round designated by index value i and let Ki1, Ki2, Ki3 and Ki4 be the four sets of four bytes of the keys related to the columns of the AES state. By definition,
Ki=[Ki1, Ki2, Ki3, Ki4].

The normal flow of operations for an AES decryption is expressed as:
ARK ([Ki1, Ki2, Ki3, Ki4])
IMC
But this is equivalent to:
IMC
ARK ([IMC(Ki1), IMC(Ki2), IMC(Ki3), IMC(Ki4)])
because operation IMC is linear.

For this reason, the AES decryption is expressed schematically as:
ARK (K10)
ISR
ISB
IMC
ARK (Kx9)
ISR
ISB
IMC
ARK (Kx8)
ISR
ISB
IMC
ARK (Kx7)
ISR
ISB
IMC
ARK (Kx6)
ISR
ISB
IMC
ARK (Kx5)
ISR
ISB
IMC
ARK (Kx4)
ISR
ISB
IMC
ARK (Kx3)
ISR
ISB
IMC
ARK (Kx2)
ISR
ISB
IMC
ARK (Kx1)
ISR
ISB
ARK (K0)

where Kxi is the subround key designated above Ki and modified as explained above (with the application of the IMC operation to it). So in this new flow of operations, each ISB operation is followed by an IMC operation except for the ISB operation between keys Kx1 and K0. This property improves efficiency between K10 and K1. Note that the computation of keys Kxi can be done in the key initialization phase.

Let IS be the function applying operation ISB on a byte and let "→" define the function "x→f(x)" meaning "x becomes f(x)" so:
Let IS1 be the function: x→09.IS(x)
IS2 be the function: x→0b.IS(x)
IS3 be the function: x→0d.IS(x)
IS4 be the function: x→0e.IS(x)

These functions are permutations from [0, 255] to [0, 255] and are implemented by a table look-up.

Applying operations ISB and IMC to a vector designated [w, x, y, z] as in the previous example is done by computing:
[[IS4(w) XOR IS1(x) XOR IS3(y) (XOR) IS2(z)],
[IS2(w) XOR IS4(x) XOR IS1(y) XOR IS3(z)],
[IS3(w) XOR IS2(x) XOR IS4(y) XOR IS1(z)],
[IS1(w) XOR IS3(x) XOR IS2(y) XOR IS4(z)]]

So to apply the operations ISB and IMC during the rounds 10 to 1, it is sufficient to apply the functions IS1 to IS4 to each byte. The output bytes remain to be logically XORed together to obtain the output of the function, as shown in the example.

Note that the final round, as depicted in FIG. 1, is different since no IMC operation is used. This implies that instead of using the operations ISi, it suffices to replace them by the operation IS.

To sum up, the AES decryption is understood as a sequence of ARK and (ISB-IMC) operations. The (ISB-IMC) operation is done by table look-up and XOR operations. This last operation is implemented with 64 table look ups for each round (4 for each byte) and 48 XOR operations.

The ISR function is simply a reordering of the AES state bytes and can be ignored in the flow of operations since it can be done at the software code compilation time.

Hereinafter, the notation [K10, Kx9, Kx8, . . . , Kxi, Kx1, . . . , K0] is simplified to [K10, . . . , Ki, . . . , K0]. From the above, it is understood that an AES cryptographic process can be expressed as a sequence of ARK and TLU operation. Those TLUs are embodied in tables of 256 bytes.

Present Method

In accordance with the invention, let P designate a linear permutation of [0,255], i.e. an injective linear function from [0,255] to itself. Permutation means changing an order of elements in a predetermined fashion; a linear permutation means changing an order of elements in a predetermined fashion such that also P(x XOR y)=P(x) XOR P(y).

Now, for any value designated x, another associated value x' is designated as the "dual value" of x, where x'=P(x). In a sense, this defines two "worlds": the "regular" world of x, and the dual P-world. The link between the regular and P-worlds is one-to-one because P is also an injective function by definition.

Now, suppose that AES decryption starts with an operation which consists of computing the dual value c' of the ciphertext designated c (meaning data or "plaintext" that has been encrypted) where in the P-world:
c'=P (c)
by calls to a table lookup which contains permutation P. This table which represents permutation P is obtained by storing, in the table's position designated by index value i, the value P(i) for each possible entry i. The minimum size of the table representing permutation P is max{P(i),i}.

In a client-server computer network architecture for using the AES cipher, on the server side, i.e. when the cipher key K is chosen, the process also precomputes the associated subkey K10', i.e. K10'=P(K10). Subkey K10' is then stored, to be used directly during the decryption.

Then as explained above, the first step of conventional AES decryption is an ARK operation logically combining subkey K10 with ciphertext c:
u=c XOR K10
It is replaced in the presently modified AES decryption in the P-world by:
u'=c'XOR K10'.
In fact, mathematically u'=P(c XOR K10), since permutation P is linear. So, in a way, this has performed operation ARK, but in a hidden way from an attacker; she will observe only the dual subkey K10', which she may well believe is unrelated to the real subkey K10. The present computations are done directly in the P-world. In other words, permutation P is compatible with logical XOR operations. That is to say, one can directly compute an XOR on values that were passed through permutation P without returning to the "regular" world; furthermore, the result is provided directly in the P-world. This enhances security, since it means that one can continue to apply the technique and remain in the P-world.

Then one computes tables also compatible with the P-world. For this, the next step of the presently AES decryption method is expressed as (T being a permutation from [0,255] to [0,255] such as the S-Box):
v=T (u)
which computation is done during the non-linear TLU calls.

To have an equivalent operation in the P-world, first compute a P-world compatible table designated T as follows:
T'[P (x)]=P(T[x]), for all possible inputs x.
Then the conventional AES operation:
v=T(u)
is replaced by the following operation, where u' in the P-world corresponds to u so u' is the dual value of u, i.e. u'=P(u):
v'=T'[u']
and the result v' is the exact dual value of v, i.e. v'=P(v)

Then, the next rounds of conventional AES are other ARK and TLU operations, so here one continues to apply the above permutation technique, continuing to remain in the P-world, where advantageously any reverse engineering is much more complex for the attacker. Note that the last TLU operation in AES is different from the others (having no MC) operation, but here it is equivalent; one can also compute a dual table.

The last ARK operation with subkey K0 is performed as explained above using the dual subkey K0'. But then, one returns to the regular world, in order to output the result. In fact, there is p', which is the dual value of the original plaintext p, in the P-world. To compute plaintext p, one simply calls the inverse of the P table, which is designated as iP=P^(−1), so p is computed as:
p=iP[p']

Second Embodiment

Using an Affine P

Instead of using a linear permutation P as above, another embodiment is generalized as follows:
P is a linear bijection
A and B are two (e.g., byte length) Boolean masks
A mask is a value to be logically or mathematically combined with an original value, to alter the original value in a predetermined fashion, and where the original value can be recovered from its masked form. Now, the elements u' in the P-world but with a Boolean mask A or B also applied are designated by u". "Affine" here refers to an affine transformation which is a generalization of a linear transformation.

Instead of having P and iP as above, one has Pa and iPb tables, where:
Pa[x]=P[x] XOR A
iPb[x]=iP[x XOR B]

The first step of the decryption of ciphertext c in the above described embodiment is computing:
c'=P(c)
which is replaced in this embodiment by:
c"=Pa(c)
which is mathematically equal to c"=c' XOR A.

The subkeys K10' to K0' each are replaced in this embodiment by subkeys as follows:

K10"=P(K10) XOR B, K0"=P(K0) XOR B.

The tables T' are replaced here by tables T", with:

T"[x]=T' [x XOR A XOR B] XOR A

At the end, one needs to return from a value (in the P-world) that will have a mask A B on it, so one applies the table iPab, with:

iPab[x]=iP[x XOR a XOR b]

The advantage of this embodiment is that values of the ciphertext are handled in the P-world protected by mask A. The mask values are selected randomly, with certain constraints. Values used for keys (i.e., keys Kx") are also handled in the P-world protected by mask B. Finally, the internal values in the decryption process have mask A XOR B applied. So operations and data both appear more independent (random looking) to the attacker who is reverse engineering the code, making the attack more difficult.

In yet another embodiment, it is clear to one skilled in the art how to apply additional masks to the tables, to make them even more random looking.

Third Embodiment

Using Different Ps

In this embodiment, between the rounds, permutation P is changed. So there are, e.g., 11 different kinds of permutation P, designated P10 to P0, each permutation P being linear and bijective. One computes subkey K10' using permutation P10, and so on to K0' which is computed using permutation P0.

The start of the AES decryption here computes:

c'=P10(c)

then subkey K10' is applied (so this is in the "P10-world"), to obtain u'=c' XOR K10'.

Then, a table T10' is applied, defined as:

T10' [P10(x)]=P9(T[x])

so one applies T10' on u', and obtains the expected value, but in the "P9-world." That is to say, this step moves from the P10-world to the P9-world.

Thus one combines u' with K9', which is already in the P9-world, and so on, using the T9' to T1' tables. After the T1' call, one is in the P0-world so one can logically XOR with subkey K0' which is in P0-world also.

Finally, apply iP0, defined as:

iP0[x]=P0^(-1)[x]

where P0^(-1) designates the inverse of permutation P0.

Fourth Embodiment

Using Splits in the P-world

The P-world is linear, so this embodiment splits operations and data. For instance, instead of logically XORing two values x' and y' in the P-world (which are dual values of x and y in the regular world), instead:

split y into y1 and y2 compute the corresponding y1'=P(y1) and y2'=P(y2)

replace y' XOR x' with y1' XOR x' XOR y2'

This makes the process more complex and so more difficult to attack.

Fifth Embodiment

A Larger World

This embodiment uses a larger P (in the previous embodiments P is from [0,255] to itself). Now consider P from 8 bit (i.e. $[0, 2^8-1]$) to w-bit (i.e. $[0, 2^w-1]$) where e.g., w=32. P is still a linear permutation. The problem here is the size of the associated T' tables. Normally, one needs to have tables of length w-bit to w-bits, which is much too large if w is large (requiring $2^w$ w-bit length tables). The following explains a way to solve this table size problem.

The following considers an 8-bit long input, but the method is generic and can be extended to any size of input value. The output value size must be larger than the input value size so as not to lose information.

The process done during the AES decryption software code compilation is as follows:

select a random permutation P from 8-bit to w-bit select a random value n, where n≥256 (the maximal value of n is described below)

if all values of P(i) modulo n are different (unique), for i=0 to i=255, continue, else, redo using another P and n There is a way to "numberize" the element in the P-world. Note that the P-world is the set of the image of P. So an element of the P-world is one of the image of P. Indeed, for any element x' in the P-world (corresponding to an element x in the regular world), there is a way to know what is that element by computing x' modulo n. Indeed, this value can be linked by a one-to-one function to x, since P(i) modulo n are by definition unique.

Thus one replaces the T' tables with the following tables designated W', and defined as:

W'[P (x)modulo n]P(T[x])

Now, in the resulting AES decryption:

start with c'=P(c) (as above)

perform operations ARK as u'=c' XOR K10' (as above)

replace the TLU by v'=W' [u' modulo n]

So the resulting W' tables are only n words long, which advantageously is much smaller than the originally expected $2^w$ words long. Finding a value of n that is small is not simple. Experimentally, it has been determined that finding n of the order of 1000 is practical in a relatively short computing time. Finding a shorter n requires much more computing resources.

Sixth Embodiment

Going into a Larger World

There is a large number of tables W', if one wants to use many permutations P (P10 to P0) as above. This requires much computation, since as indicated above n is not a small number. The goal in this embodiment is to reduce the total size of the tables and the amount of computation.

Let z≥256 be a random number. Number z may be relatively small, e.g. 299. In order to reduce the total table size, compute a single table F, such that:

F[i] is an integer in [0,z-1], for all i in [0,255], and     F[P(i) modulo n] are unique, for all i in [0,255]

It is easy to compute such a table F, since there are 256 possible values for i and z≥256 possible output values.

Then replace the W tables by X' tables, with X' defined as:

X'[F[P (i)modulo n]]=P(T[x])

Now, in the present embodiment of AES decryption:

start with c'=P(c) (as before)

perform operations ARK as u'=c' XOR K10' (as before)

replace TLU by v'=X' [F[u' modulo n]]

So the advantage is that the resulting total size of the tables is: n+t*z where t is the number of tables. This is much smaller than without this particular embodiment, since normally the number of tables is equal to t*n.

Figure 2:
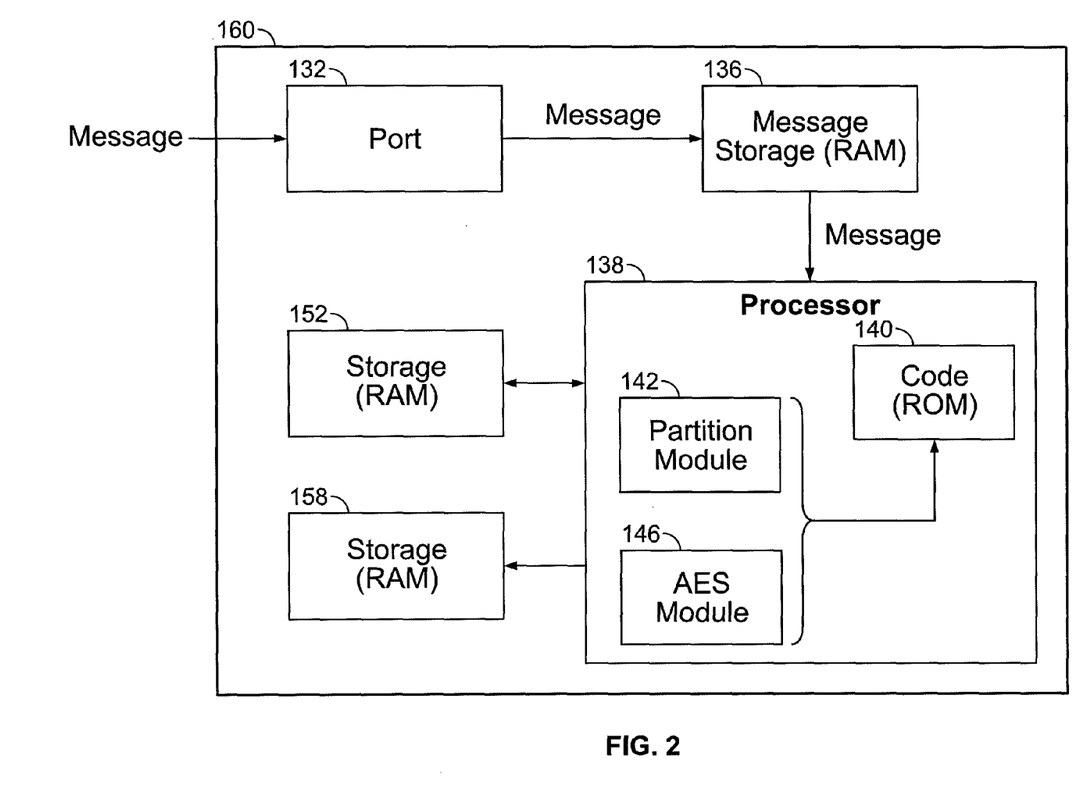
FIG. 2 shows a computing system in accordance with the invention.

FIG. 2 shows in a block diagram relevant portions of a computing device (system) 160 in accordance with the invention which carries out the cryptographic process as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Essentially a similar apparatus encrypts the message, and may indeed be part of the same platform.

The computer code is conventionally stored in code memory (computer readable storage medium) 140 (as object code or source code) associated with conventional processor 138 for execution by processor 138. The incoming ciphertext (or plaintext) message (in digital form) is received at port 132 and stored in computer readable storage (memory 136 where it is coupled to processor 138. Processor 138 conventionally then partitions the message into suitable sized blocks at partitioning module 142. Another software (code) module in processor 138 is the decryption module 146 which carries out the key-schedule functionality and decryption functions set forth above, with its associated computer readable storage (memory) 152.

Also coupled to processor 138 is a computer readable storage (memory) 158 for the resulting decrypted plaintext message. Storage locations 136, 140, 152, 158 may be in one or several conventional physical memory devices (such as semiconductor RAM or its variants or a hard disk drive). Electric signals conventionally are carried between the various elements of FIG. 2. Not shown in FIG. 2 is any subsequent conventional use of the resulting plaintext or ciphertext stored in storage 145.

Figure 3:
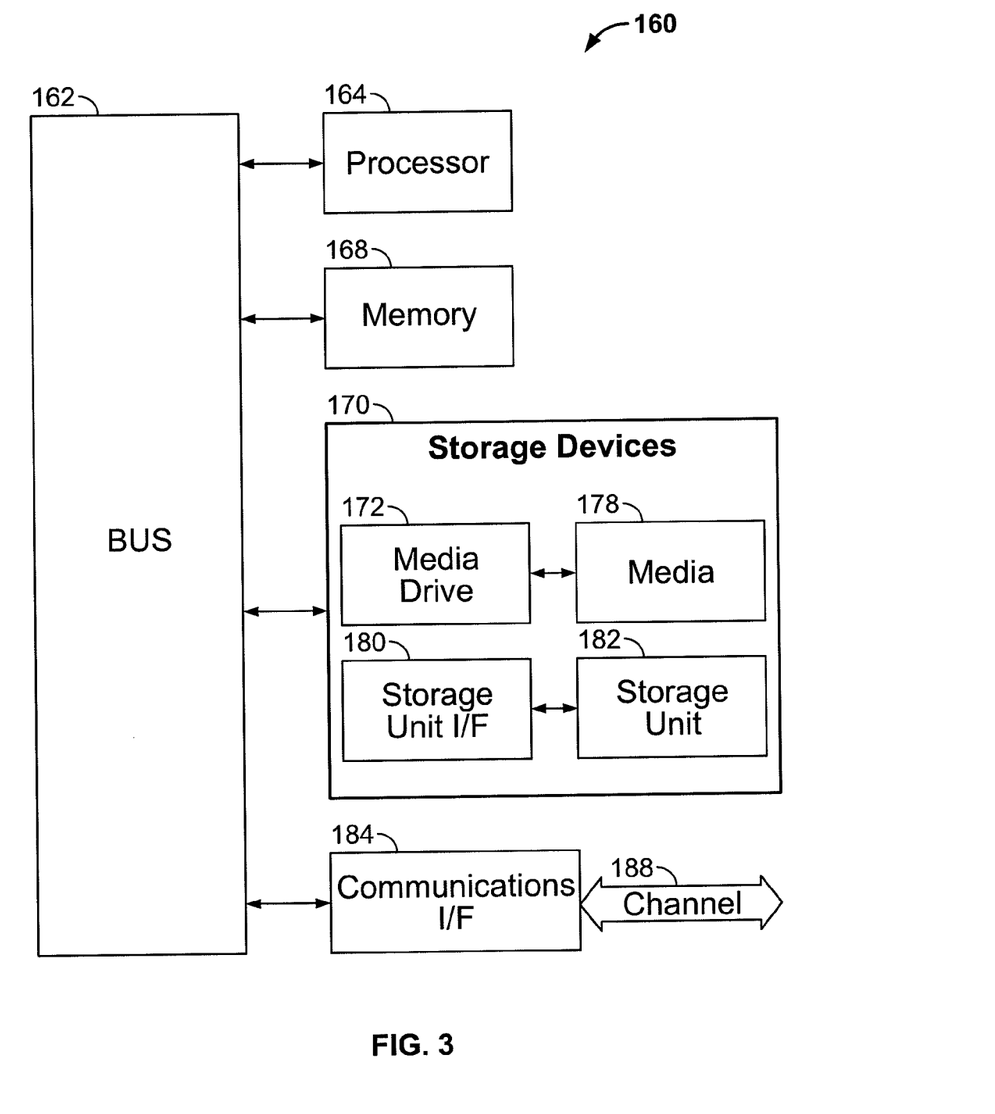
FIG. 3 shows a computing system as known in the art and used in accordance with the invention.

FIG. 3 illustrates detail of a typical and conventional embodiment of computing system 160 that may be employed to implement processing functionality in embodiments of the invention as indicated in FIG. 2 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 2). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to part 132 in FIG. 2). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method performed by at least one processing unit of a first computing device, the method comprising:
receiving a permuted encrypted message from a second computing device, wherein the permuted encrypted message has been previously permuted with a linear injective permutation;
using a permuted cryptographic key to apply a decryption operation to the permuted encrypted message in order to obtain a decrypted permuted message, the decryption operation comprising a plurality of rounds;
after completion of the plurality of rounds of the decryption operation, applying an inverse of the linear injective permutation that removes the linear injective permutation from the decrypted permuted message in order to generate a decrypted message; and
storing the decrypted message in a non-transitory machine readable storage medium.

2. The method of claim 1, wherein the decryption operation includes at least one exclusive OR operation.

3. The method of claim 1, wherein the inverse linear injective permutation is defined in a table stored in the non-transitory machine readable storage medium, wherein the table has a plurality of entries, each entry having an index value and a value of the inverse linear injective permutation for that index value.

4. The method of claim 1, wherein the permuted cryptographic key comprises a set of permuted subkeys, and wherein each of the plurality of rounds of the decryption operation applies one of the permuted subkeys.

5. The method of claim 1, wherein the decryption operation includes a block cipher.

6. The method of claim 1, wherein the decryption operation is adapted for an insecure environment.

7. The method of claim 1, wherein the linear injective permutation is of 256 elements.

8. The method of claim 1, wherein each of the plurality of rounds of the decryption operation includes applying a predetermined set of operations including at least one of an exclusive OR operation, a bit move operation, and a table lookup operation.

9. The method of claim 4 further comprising generating the set of permuted subkeys from the permuted cryptographic key, wherein the permuted cryptographic key is stored in the non-transitory machine readable storage medium.

10. The method of claim 1, wherein the permuted encrypted message has been previously logically combined with a mask value.

11. The method of claim 10, wherein the logical combination of the permuted encrypted message with the mask value was performed using table lookups.

12. The method of claim 4, further comprising changing the linear injective permutation applied to the permuted encrypted message and the permuted key at each round of the decryption operation.

13. The method of claim 12, wherein each change of the linear injective permutations is performed using a table lookup.

14. The method of claim 1 further comprising:
partitioning the permuted encrypted message into a plurality of elements;
using the permuted cryptographic key to apply the decryption operation to each of the plurality of elements; and
applying the inverse linear injective permutation to each of the plurality of elements.

15. The method of claim 1, wherein the linear injective permutation is in $[0,2^w-1]$, w being in a range of 8 to 32.

16. An electronic system comprising:
a set of processing units for executing sets of instructions;
a non-transitory machine readable medium storing a program, the program comprising sets of instructions for:
receiving a permuted encrypted message from a computing device, wherein the permuted encrypted message has been previously permuted with a linear injective permutation;
using a permuted cryptographic key to apply a decryption operation to the permuted encrypted message in order to obtain a decrypted permuted message, the decryption operation comprising a plurality of rounds;
after completion of the plurality of rounds of the decryption operation, applying an inverse of the linear injective permutation that removes the linear injective permutation from the decrypted permuted in order to generate a decrypted message; and
storing the decrypted message.

17. The electronic system of claim 16, wherein the decryption operation includes at least one exclusive OR operation.

18. The electronic system of claim 16, wherein the inverse linear injective permutation is defined in a table that has a plurality of entries, each entry having an index value and the value of the inverse linear injective permutation for that index value.

19. The electronic system of claim 16, wherein the permuted cryptographic key comprises a set of permuted subkeys, and wherein each of the plurality of rounds of the decryption operation applies one of the permuted subkeys.

20. The electronic system of claim 16, wherein the decryption operation includes a block cipher.

21. The electronic system of claim 16, wherein the decryption operation is adapted for an insecure environment.

22. The electronic system of claim 16, wherein the linear injective permutation is of 256 elements.

23. The electronic system of claim 16, wherein each of the plurality of rounds of the decryption operation includes applying a predetermined set of operations including at least one of an exclusive OR operation, a bit move operation, and a table lookup operation.

24. The electronic system of claim 19, wherein the program further comprises a set of instructions for generating the permuted subkeys from the permuted cryptographic key.

25. The electronic system of claim 16, wherein the permuted encrypted message has been previously logically combined with a mask value.

26. The electronic system of claim 25, wherein the logical combination of the permuted encrypted message with the mask value was performed using table lookups.

27. The electronic system of claim 19, wherein the program further comprises sets of instructions for changing the linear injective permutation applied to the permuted encrypted message and the permuted cryptographic key at each round of the decryption operation.

28. The electronic system of claim 27, wherein each change of the linear injective permutations is performed using a table lookup.

29. The electronic system of claim 16, wherein the program further comprises sets of instructions for:
- partitioning the permuted encrypted message into a plurality of elements;
- using the permuted cryptographic key to apply the decryption operation to each of the plurality of elements; and
- applying the inverse linear injective permutation to each of the plurality of elements.

30. The electronic system of claim 16, wherein the linear injective permutation is in $[0,2^w-1]$, w being in a range of 8 to 32.

31. A non-transitory machine readable medium storing a program which when executed by at least one processing unit of an electronic device applies a decryption operation to a permuted encrypted message, the program comprising sets of instructions for:
- receiving a permuted encrypted message from a second computing device, wherein the permuted encrypted message has been previously permuted with a linear injective permutation;
- using a permuted cryptographic key to apply a decryption operation to the permuted encrypted message in order to obtain a decrypted permuted message, the decryption operation comprising a plurality of rounds;
- after completion of the plurality of rounds of the decryption operation, applying an inverse of the linear injective permutation that removes the linear injective permutation from the decrypted permuted message in order to generate a decrypted message; and
- storing the decrypted message.

32. The non-transitory machine readable medium of claim 31, wherein the linear injective permutation is in $[0,2^w-1]$, w being in a range of 8 to 32.

33. The non-transitory machine readable medium of claim 31, wherein each of the plurality of rounds of the decryption operation includes applying a predetermined set of operations including at least one of an exclusive OR operation, a bit move operation, and a table lookup operation.

34. The non-transitory machine readable medium of claim 31, wherein the program further comprises sets of instructions for changing the linear injective permutation applied to the permuted encrypted message and the permuted cryptographic key at each round of the decryption operation.

35. The non-transitory machine readable medium of claim 34, wherein each change of the linear injective permutations is performed using a table lookup.

36. The non-transitory machine readable medium of claim 31, wherein the program further comprises sets of instructions for:
- partitioning the permuted encrypted message into a plurality of elements;
- using the permuted cryptographic key to apply the decryption operation to each of the plurality of elements; and
- applying the inverse linear injective permutation to each of the plurality of elements.

\* \* \* \* \*